(12) United States Patent
Oogami et al.

(10) Patent No.: US 6,723,466 B2
(45) Date of Patent: Apr. 20, 2004

(54) STORAGE BATTERY WITH LAMINATED BATTERY ELEMENT

(75) Inventors: Etsuo Oogami, Kanagawa (JP); Tatsuo Horiba, Saitama (JP)

(73) Assignees: Nissan Motor Co., Ltd., Kanagawa (JP); Shin-Kobe Electric Machinery Co., Ltd., Tokyo (JP)

(*) Notice: Subject to any disclaimer, the term of this patent is extended or adjusted under 35 U.S.C. 154(b) by 159 days.

(21) Appl. No.: 09/804,077

(22) Filed: Mar. 13, 2001

(65) Prior Publication Data

US 2001/0036571 A1 Nov. 1, 2001

(30) Foreign Application Priority Data

Mar. 15, 2000 (JP) ........................................ 2000-071558

(51) Int. Cl.[7] ................................................ H01M 6/10
(52) U.S. Cl. .......................... 429/94; 429/96; 429/100
(58) Field of Search ............................. 429/94, 96, 100

(56) References Cited

U.S. PATENT DOCUMENTS 6,032,943 A * 3/2000 Yabushita et al. .......... 271/109
6,447,946 B1 * 9/2002 Nakai et al. ................. 429/53
6,451,473 B1 * 9/2002 Saito et al. .................. 429/94

FOREIGN PATENT DOCUMENTS

DE 19731114 A1 * 1/1999 ........... H01L/21/68

* cited by examiner

Primary Examiner—Carol Chaney
Assistant Examiner—Dah-Wei D. Yuan
(74) Attorney, Agent, or Firm—McDermott, Will & Emery

(57) ABSTRACT

A storage battery includes a rolled, laminated battery element made up of two groups of electrode materials composed of positive and negative electrode materials, laminated together through separators, an outer sheathing enclosing therein the laminated battery element, a spindle around which the laminated battery element is wound and rolled up so that the spindle and the laminated battery element are fixedly connected to each other. One axial end of the spindle is constrained in the axial direction of the laminated battery element by the bottom of the outer sheathing, while the other axial end of the spindle is elastically supported by an upper lid portion hermetically covering the opening end, so as to stably support the laminated battery element by the spindle and to prevent displacement of the laminated battery element from its set position even during application of vibrations to the storage battery.

9 Claims, 6 Drawing Sheets

STORAGE BATTERY WITH LAMINATED BATTERY ELEMENT

TECHNICAL FIELD

The present invention relates to a rechargeable battery, and particularly to a storage battery used in automotive vehicles such as battery-driven electric vehicles (EVES), hybrid electric vehicles (HEMS) and the like.

BACKGROUND ART

An electric vehicle or a hybrid electric vehicle often uses a lithium-ion battery, a nickel-metal hydride hydrogen battery, or the like as a secondary battery, to draw energy therefrom for vehicle propulsion. In such storage batteries, two groups of sheet-like electrode materials, namely positive and negative electrode materials are layer-built or laminated together so that each electrode material is insulated from adjacent electrode materials by means of separators. Thereafter, the laminated product is rolled up to produce a rolled, laminated battery element made up of two groups of electrode materials, that is, positive electrode materials and negative electrode materials. The laminated battery element is enclosed in a battery case or an outer sheathing can (hereinafter is referred to as "outer sheathing") made of a metal material, and then the storage battery is assembled or constructed by installing a metal lid on the opening end of the outer sheathing through an insulating material, so that the metal lid is insulated from the outer sheathing with the insulating material interleaved between them. A pair of insulation plates are further provided at both ends of the outer sheathing enclosing therein the laminated battery element, that is, at the outer-sheathing bottom closed end and at the lid side of the outer sheathing. A positive electrode side of the laminated battery element is connected to the lid side by means of a positive-electrode lead. On the other hand, a negative electrode side of the laminated battery element is connected to the outer sheathing by means of a negative-electrode lead. When such a storage battery is put into the vehicle, undesired vibrations are transmitted to the storage battery during vehicle driving. Generally, the laminated battery element is merely enclosed in the outer sheathing, but not satisfactorily fixed to the outer sheathing or to the lid side. In such a case, there is a possibility that both side wall surfaces of the laminated battery element impinge upon the respective insulation plates, and thus wear occurs on those impinged surfaces.

SUMMARY OF THE INVENTION

Accordingly, it is an object of the invention to provide a battery with a shock-proof mounted, laminated battery element enclosed in a battery case (an outer sheathing), which avoids the aforementioned disadvantages.

In order to accomplish the aforementioned and other objects of the present invention, a storage battery comprises a rolled, laminated battery element made up of two groups of electrode materials composed of positive and negative electrode materials, laminated together through separators which separate the positive and negative electrode materials, a substantially cylindrical hollow battery case enclosing therein the laminated battery element, a spindle arranged along a direction of an axis of the rolled, laminated battery element so that the spindle is fixedly connected to the laminated battery element, a first axial end of the spindle being constrained in the axial direction of the laminated battery element, and a second axial end of the spindle being elastically supported.

According to another aspect of the invention, a storage battery comprises a rolled, laminated battery element made up of two groups of sheet-shaped electrode materials composed of positive and negative electrode materials, laminated together through separators which separate the positive and negative electrode materials to prevent the positive and negative electrode materials from touching, a substantially cylindrical hollow battery case enclosing therein the laminated battery element, a cylindrical hollow spindle made of an electrical insulating material and arranged along a direction of an axis of the rolled, laminated battery element so that the spindle is fixedly connected to the laminated battery element and coaxially arranged with the laminated battery element with respect to the axis of the laminated battery element, a first axial end of the spindle being constrained in the axial direction of the laminated battery element, and a second axial end of the spindle being elastically supported.

According to a still further aspect of the invention, a storage battery comprises a rolled, laminated battery element made up of two groups of sheet-shaped electrode materials composed of positive and negative electrode materials, laminated together through separators which separate the positive and negative electrode materials to prevent the positive and negative electrode materials from touching, each of the positive electrode materials comprising a sheet of aluminum material with a layer of positive-electrode active material on both sides and each of the negative electrode materials comprising a sheet of copper material with a layer of negative-electrode active material on both sides, a substantially cylindrical hollow battery case enclosing therein the laminated battery element, a cylindrical hollow spindle made of a plastic material and arranged along a direction of an axis of the rolled, laminated battery element so that the spindle is fixedly connected to the laminated battery element and coaxially arranged with the laminated battery element with respect to the axis of the laminated battery element, a first axial end of the spindle being constrained in a radial direction as well as the axial direction of the laminated battery element, and a second axial end of the spindle being elastically supported.

The other objects and features of this invention will become understood from the following description with reference to the accompanying drawings.

DESCRIPTION OF THE PREFERRED EMBODIMENTS

Figure 1:
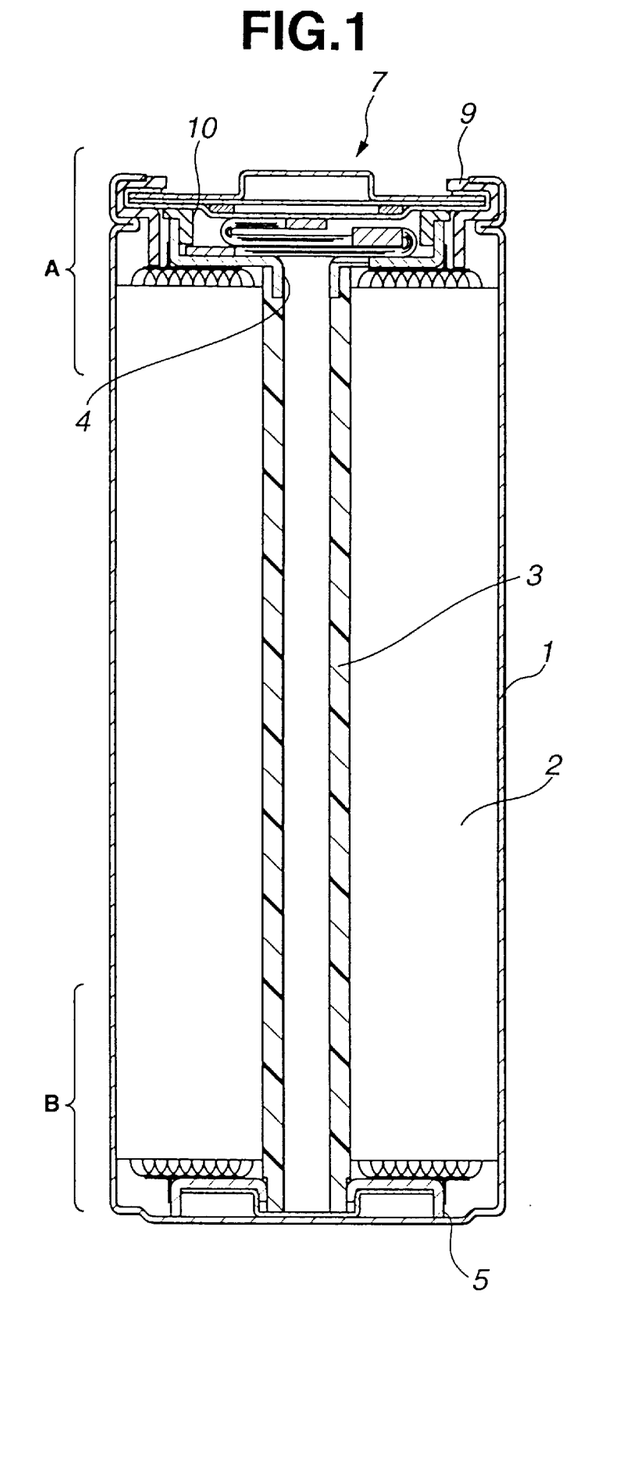
FIG. 1 is a longitudinal cross sectional view illustrating one embodiment of a storage battery of a shock proof structure.
Figure 2:
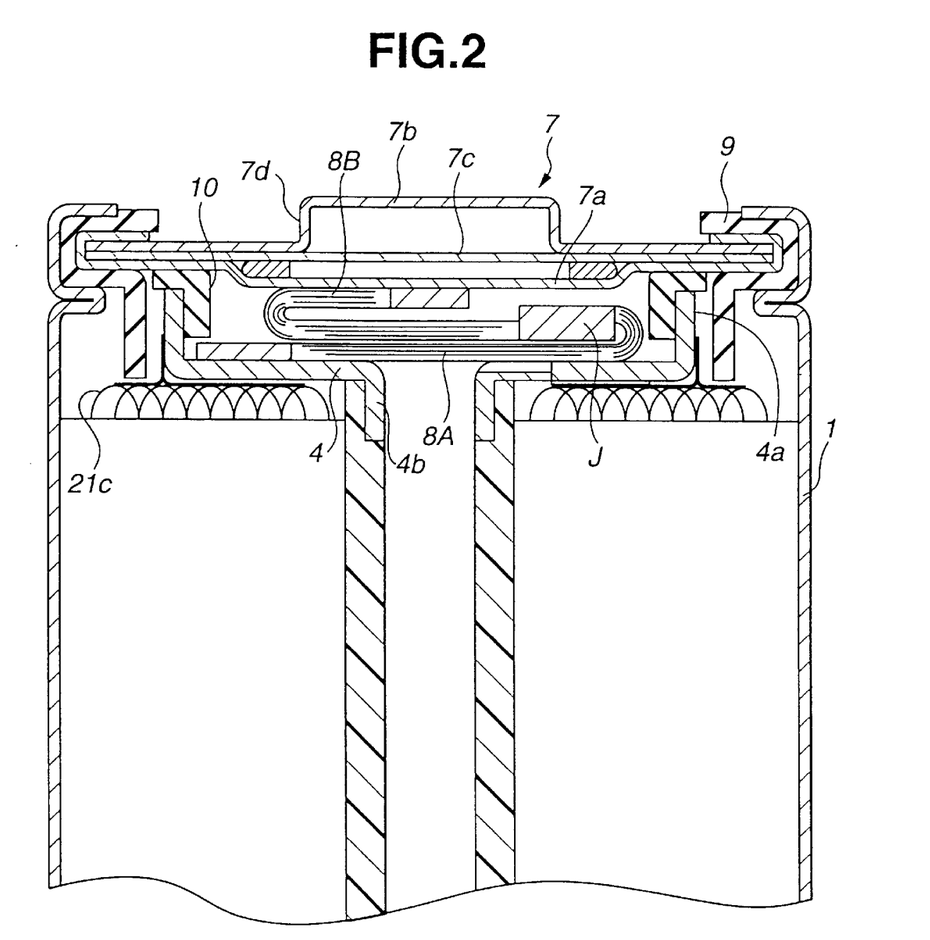
FIG. 2 is a partly-enlarged cross sectional view of an upper portion "A" of the storage battery of the embodiment shown in FIG. 1
Figure 3:
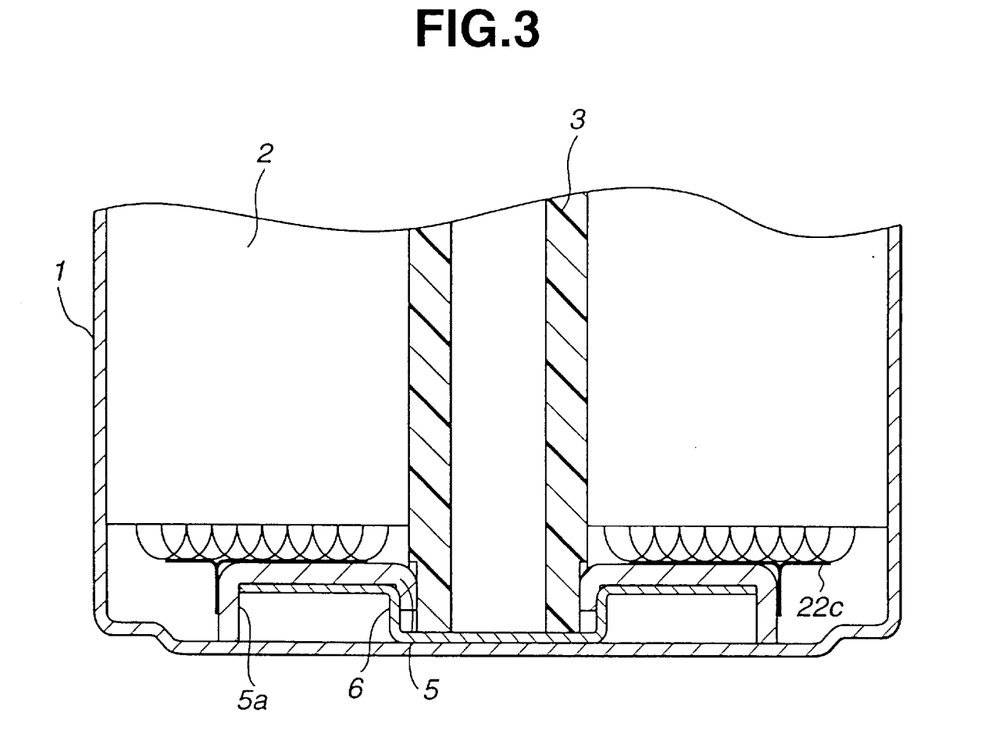
FIG. 3 is a partly-enlarged cross sectional view of a lower portion "B" of the storage battery of the embodiment shown in FIG. 1.
Figure 4:
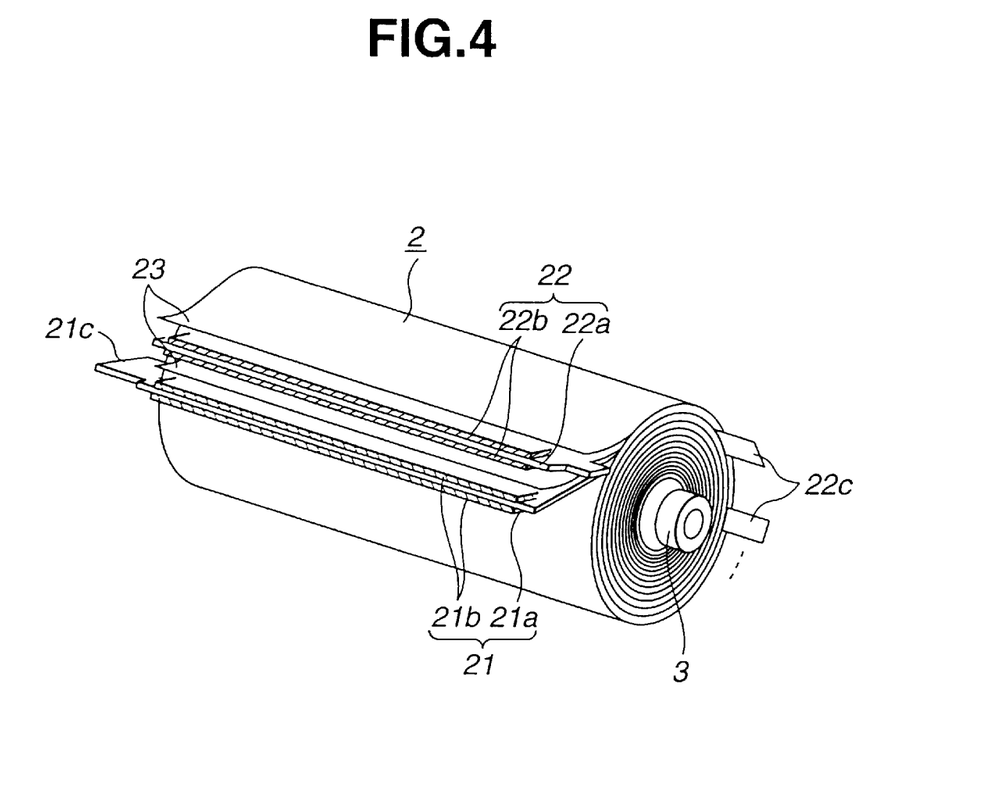
FIG. 4 is a perspective view illustrating a rolled, laminated battery element 2 of the storage battery of the embodiment.

Referring now to the drawings, particularly to FIGS. 1, 2, and 3, a rolled, laminated battery element 2 is placed or enclosed in a substantially cylindrical hollow outer sheathing can (hereinafter is referred to as "outer sheathing") 1, so that the rolled, laminated battery element is wound around a cylindrical hollow spindle 3. Spindle 3 is made of synthetic resin or a plastic material which is an electrical insulating material. As described later, outer sheathing 1 serves as a negative electrode of the storage battery. As shown in FIG. 1, outer sheathing 1 has an upper opening end and a lower closed end. Laminated battery element 2 is rolled up around the spindle like a roll film. As clearly shown in FIG. 4, in producing laminated battery element 2, first, two groups of sheet-like electrode materials, namely positive electrode materials 21 and negative electrode materials 22 are layer-built, laminated or nested together through separators 23 which separate positive and negative electrode materials 21 and 22 to prevent the positive and negative electrode materials from actually touching. Second, the laminated product is rolled up around the spindle 3 to produce the rolled, laminated battery element composed of separators 23, and positive and negative electrode materials 21 and 22 electrically insulated from each other through the separators. By rolling up or winding the laminated product around the spindle, the spindle and the laminated product are fixedly connected to each other so that rolled, laminated battery element 2 and spindle 3 are coaxially arranged each other with respect to the axis of spindle 3 (or the axis of the rolled, laminated battery element 2). Each of positive electrode materials 21 is comprised of a sheet of aluminum material 21a with a layer of positive-electrode active material 21b on both sides. On the other hand, each of negative electrode materials 22 is comprised of a sheet of copper material 22a with a layer of negative-electrode active material 22b on both sides. As can be seen from the perspective view of FIG. 4, negative-electrode sheet 22a is formed integral with a plurality of tab-like negative-electrode connecting portions 22c which are provided at one axial end (lower axial end in FIG. 1) of rolled, laminated battery element 2 in such a manner as to extend in one axial direction of the spindle 3. As shown in FIGS. 1 and 3, negative-electrode connecting portions 22c are electrically connected to a negative-electrode ring 5 by way of welding. Although only one positive-electrode connecting portion 21c is shown in FIG. 4, positive-electrode connecting portions 21c are integrally formed with positive-electrode sheet 21a and provided at the other axial end of rolled, laminated battery element 2 in such a manner as to extend in the opposite axial direction of spindle 3. As shown in FIGS. 1 and 2, positive-electrode connecting portions 21c are electrically connected to a positive-electrode ring 4 by way of welding. As best seen from the enlarged cross section shown in FIG. 3, a part of the lower end of cylindrical hollow spindle 3, made of a plastic material, is formed as a relatively small-outside-diameter portion. Negative-electrode ring 5 is fitted onto the lower small-outside-diameter portion of cylindrical hollow spindle 3. A negative-electrode lead 6 is welded to the lower surface of negative-electrode ring 5. Also, negative-electrode lead 6 is spot-welded to the bottom of outer sheathing 1 made of a metal material (conductive material). By virtue of such spot-welding, negative-electrode ring 5 is electrically connected through negative-electrode lead 6 to outer sheathing 1. As shown in FIG. 3, negative-electrode ring 5 is formed at its inner periphery with a small-diameter collared portion extending in the downward axial direction of spindle 3 and having a cylindrical bore into which the lower small-outside-diameter portion of cylindrical hollow spindle 3 is fitted, and also formed at its outer periphery with a substantially cylindrical large-diameter collared portion 5a extending in the downward axial direction of spindle 3. Negative-electrode connecting portions 22c of rolled, laminated battery element 2 are electrically connected to the outer peripheral wall surface of collared portion 5a of negative-electrode ring 5 by way of soldering or welding. Spot-welding of negative-electrode lead 6 to the bottom of outer sheathing 1, is achieved under a condition where one of welding electrodes is fitted or inserted into the cylindrical hollow spindle 3. As can be seen from the enlarged cross section of FIG. 2, a part of the upper end of cylindrical hollow spindle 3, made of a plastic material, is formed as an enlarged inside-diameter portion. Positive-electrode ring 4 is formed at its inner periphery with a small-diameter collared portion 4b extending in the downward axial direction of spindle 3 and fitted into the enlarged inside-diameter portion of cylindrical hollow spindle 3, and also formed at its outer periphery with a substantially cylindrical large-diameter collared portion 4a extending in the upward axial direction of spindle 3. Positive-electrode connecting portions 21c of rolled, laminated battery element 2 are electrically connected to the outer peripheral wall surface of collared portion 4a of positive-electrode ring 4 by way of soldering or welding. In FIG. 2, a component part denoted by reference sign 7 is an upper lid portion which is provided to hermetically cover and close the upper opening end of outer sheathing 1. The upper lid portion 7 is comprised of an upper lid case 7a, an upper lid cap 7b, and a gas release vent 7c. Upper lid case 7a, upper lid cap 7b and gas release vent 7c are integrally connected to each other as a sub-assembly, such that gas release vent 7c is sandwiched between upper lid case 7 and upper lid cap 7b. Upper lid cap 7b is made of a conductive material and functions as a positive-electrode terminal. Gas release vent 7c is designed to open when a gas pressure in the outer sheathing can exceeds a predetermined threshold pressure value. Upper lid cap 7b is formed with a vent hole 7d through which the internal pressure in outer sheathing 1 can be escaped to the outside when the gas pressure exceeds the predetermined threshold and thus the gas release vent opens. As shown in FIG. 2, a positive-electrode lead material 8B is electrically connected to and located on the underside of upper lid case 7a, while a positive-electrode lead material 8A is electrically connected to and located on the upside of positive-electrode ring 4. The previously-noted two positive-electrode lead materials 8A and 8B are connected to each other at a junction J. After two positive-electrode lead materials 8A and 8B are connected with each other through the junction J, as shown in FIG. 2 upper lid sub-assembly 7 is fixedly connected to the upper portion of outer sheathing 1. A gasket 9 is provided at a connecting portion between outer sheathing 1 and upper lid sub-assembly 7 to provide a gas-tight seal. The gasket 9 functions as an electrical insulator as well as a gas-tight seal, so as to electrically insulate the upper lid sub-assembly from the outer sheathing can. A substantially cylindrical, flanged elastic member 10, such as rubber material, is interleaved between collared portion 4a of positive-electrode ring 4 and upper lid case 7a. Actually, upper lid case 7a is installed onto the upper end of the outer sheathing, while slightly compressing and pre-loading the elastic member. As a result, spindle 3 is sandwiched between negative-electrode lead 6 and upper lid case 7a through positive-electrode ring 4 and elastic member 10. At this time, the lower end of spindle 3 is fitted into the central hole of the small-diameter collared portion of negative-electrode ring 5, and thus there is less lateral displacement of the spindle during application of vibrations transmitted from the road surface via the vehicle body to the storage battery. In this manner, by way of fitting between the lower end of outer sheathing 1 and the small-diameter collared portion of negative-electrode ring 5, the lower end of spindle 3 is reliably fixedly supported at the bottom of outer sheathing 1 and the lower end of spindle 3 is properly constrained in the radial direction as well as in the axial direction. In contrast to the above, the upper end of spindle 3 is elastically supported on upper lid case 7*a* through positive-electrode ring 4 and elastic member 10.

As set forth above, according to the storage-battery structure of the embodiment, cylindrical hollow spindle 3 is integrally connected or fixed to rolled, laminated battery element 2 as a central part of the laminated battery element, and the spindle is sandwiched between the bottom of outer sheathing 1 and upper lid portion 7. Additionally, the upper end of spindle 3 is elastically supported by means of elastic member 10. Thus, there is no risk of axially displacing the laminated battery element from its set position with undesired vibrations applied to the storage battery. By the use of elastic support (elastic member 10) one end of the spindle is elastically supported. Therefore, even when the internal gas pressure in the outer sheathing rises up owing to gases generated from the laminated battery element during battery action and the bottom of the outer sheathing can (battery case) expands outwards and thus the battery case is deformed slightly in the axial direction of spindle 3, the spindle is somewhat pushed down by means of elastic member 10 and therefore there is no risk of axially displacing the laminated battery element. As discussed above, even when the battery case (outer sheathing 1) is slightly deformed due to the increased gas pressure in the case, the spindle can be supported stably by way of elastic-support action of the elastic member.

Figure 5:
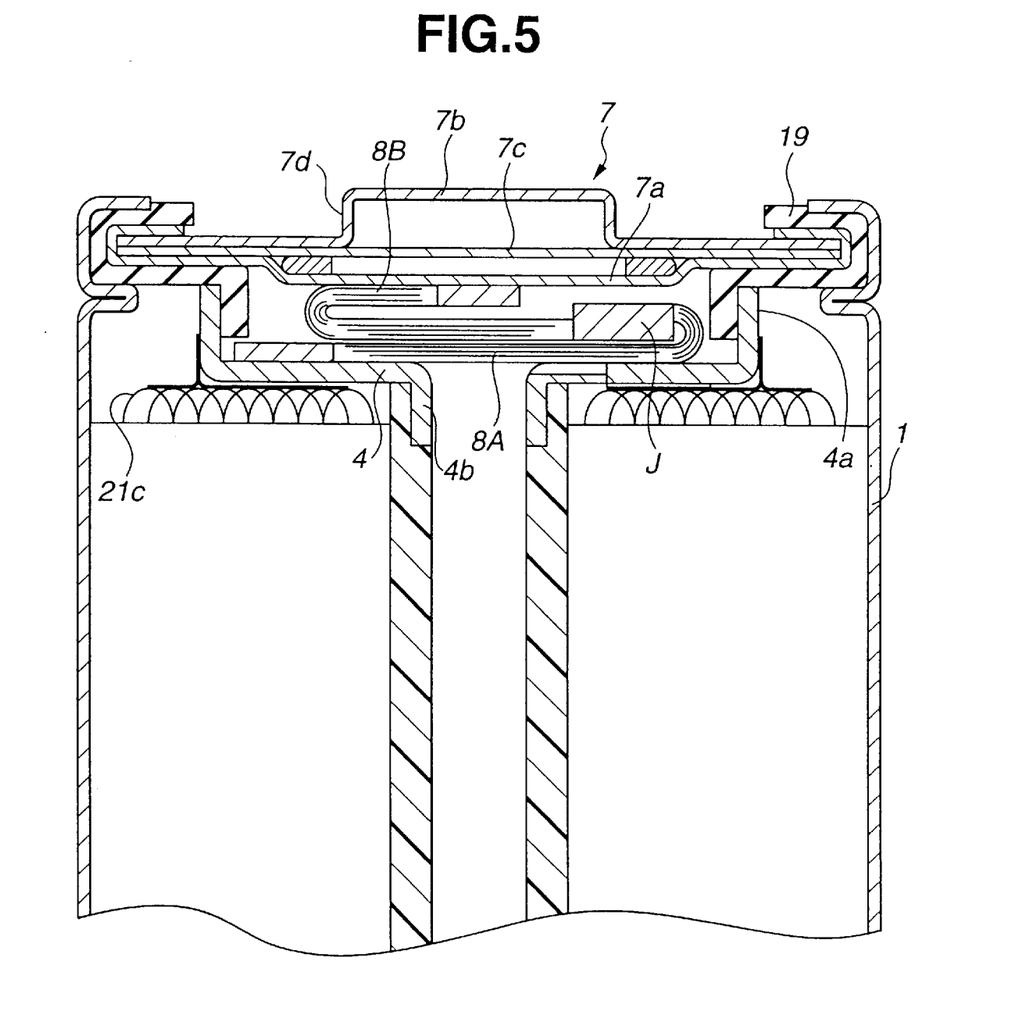
FIG. 5 is a partly-enlarged cross sectional view illustrating a first modification of the upper portion "A" of the storage battery.

Referring now to FIG. 5, there is shown the first modification of the storage battery. In the storage battery of the embodiment shown in FIG. 2, gasket 9 and elastic member 10 are constructed as two separated parts. On the other hand, in the storage battery of the first modification shown in FIG. 5, the two separated parts, namely gasket 9 and elastic member 10 are replaced with a substantially annular, single gasket 19. The annular gasket 19 is a substantially annular electrical insulator which is located at the opening end of outer sheathing 1 between the outer peripheral portion of the upper lid portion and the inner peripheral portion of the opening end of outer sheathing 1 to extend completely around the inner peripheral portion of the opening end and to hermetically seal the outer sheathing. That is, gasket 19 serves as an elastic member, a gas-tight seal, and an electrical insulator. In more detail, the gasket 19 functions as a gas-tight seal as well as an electrical insulator between the outer sheathing and the upper lid sub-assembly. Additionally, the upper end of positive-electrode ring 4 is elastically supported by means of gasket 19. Therefore, the storage battery of the first modification of FIG. 5 equipped with the sole elastic gasket member 19 can provide the same effects as the storage battery of FIG. 2. As compared to the two separated parts, namely gasket 9 and elastic member 10, the electrically-insulating elastic support composed of the sole gasket 19 is simple in structure.

Figure 6A:
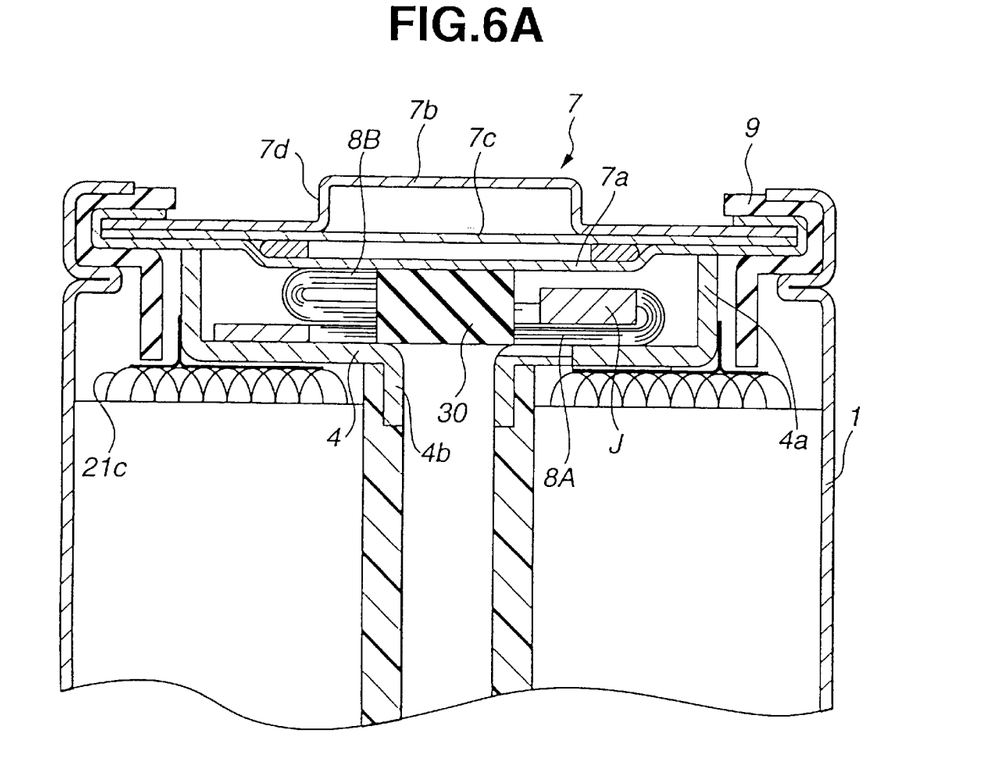
FIG. 6A is a partly-enlarged cross sectional view illustrating a second modification of the upper portion "A" of the storage battery.
Figure 6B:
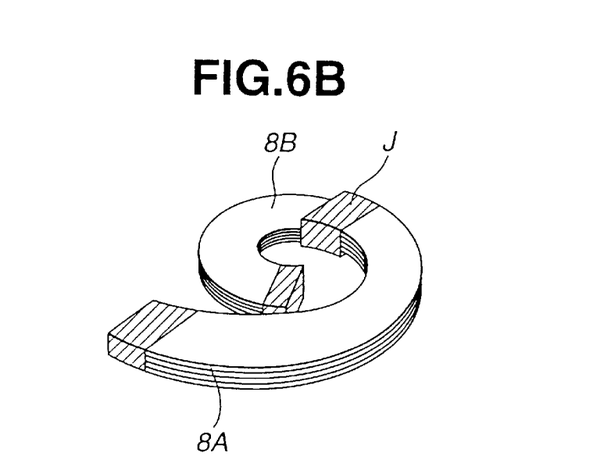
FIG. 6B is a perspective view illustrating a positive-electrode lead composed of positive lead materials 8A and 8B.

Referring now to FIGS. 6A and 6B, there is shown the second modification of the storage battery. The modified storage battery of FIGS. 6A and 6B is similar to the storage battery of FIG. 2, except that an elastic member 30 is provided at the center portion of upper lid portion 7 so that the upper end of spindle 3 is elastically supported by the center portion of upper lid portion 7. Thus, the same reference signs used to designate elements in the storage battery shown in FIG. 2 will be applied to the corresponding elements used in the modified storage battery shown in FIGS. 6A and 6B, for the purpose of comparison of the two different storage batteries. In case of the storage battery of the second modification shown in FIGS. 6A and 6B, the positive-electrode lead materials 8A and 8B must be formed spirally (see FIG. 6B), so that there is no touch between the inner peripheral portion of the spirally-formed positive-electrode lead materials (8A, J, 8B) and the outer periphery of elastic member 30, in order to permit satisfactory elastic-support action of elastic member 30 and to increase the flexibility of the positive-electrode lead assembly (8A, J, 8B). Therefore, the storage battery of the second modification of FIGS. 6A and 6B equipped with the central elastic member 30 can provide the same effects as the storage battery of FIG. 2.

In the shown embodiment, the lower axial end of spindle 3 is constrained in the axial direction and the upper axial end of spindle 3 is elastically supported. In order to the same effects as the storage battery of the embodiment, as a matter of course, the upper axial end of spindle 3 is constrained in the opposite axial direction and the lower axial end of spindle 3 is elastically supported.

The entire contents of Japanese Patent Application No. P2000-071558 (filed Mar. 15, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A storage battery which comprises:
    a rolled, laminated battery element made up of two groups of electrode materials composed of positive and negative electrode materials, laminated together through separators which separate the positive and negative electrode materials;
    a cylindrical hollow battery case enclosing therein the laminated battery element;
    a spindle arranged along a direction of an axis of the rolled, laminated battery element so that the spindle is fixedly connected to the laminated battery element;
    a first axial end of the spindle being constrained in the axial direction of the laminated battery element;
    a second axial end of the spindle being elastically supported;
    the battery case comprising a cylindrical hollow outer sheathing closed at one end and having an opening end, and a lid mounted on the outer sheathing to hermetically cover the opening end;
    the first axial end of the spindle being constrained in the axial direction by the closed end of the outer sheathing; and
    the second axial end of the spindle being elastically supported by the lid.

2. The storage battery as claimed in claim 1, wherein:
    the spindle is fixed to the laminated battery element as a central part of the laminated battery element; and
    the second axial end of the spindle is elastically supported by the center portion of the lid.

3. A storage battery which comprises:

a rolled, laminated battery element made up of two groups of sheet-shaped electrode materials composed of positive and negative electrode materials, laminated together through separators which separate the positive and negative electrode materials to prevent the positive and negative electrode materials from touching;

a cylindrical hollow battery case enclosing therein the laminated battery element;

a cylindrical hollow spindle made of an electrical insulating material and arranged along a direction of an axis of the rolled, laminated battery element so that the spindle is fixedly connected to the laminated battery element and coaxially arranged with the laminated battery element with respect to the axis of the laminated battery element;

a first axial end of the spindle being constrained in the axial direction of the laminated battery element;

a second axial end of the spindle being elastically supported;

the battery case comprising a cylindrical hollow outer sheathing closed at one end and having an opening end and made of a conductive material, and a lid mounted on the outer sheathing to hermetically cover the opening end;

a negative-electrode ring being fixedly connected to the closed end of the outer sheathing and having a collared portion having a cylindrical bore to which the first axial end of the spindle is fitted so that the first axial end of the spindle is constrained in the axial direction by the collared portion of the negative-electrode ring;

a positive-electrode ring having a collared portion having a cylindrical bore to which the second axial end of the spindle is fitted; and an elastic member being interleaved between the positive-electrode ring and the lid so that the second axial end of the spindle is elastically supported on the lid via the elastic member.

4. The storage battery as claimed in claim 3, wherein:

the spindle is fixed to the laminated battery element as a central part of the laminated battery element; and the second axial end of the spindle is elastically supported on the center portion of the lid via the elastic member.

5. The storage battery as claimed in claim 3, wherein:

the elastic member comprises an annular electrical insulator which is interleaved between the positive-electrode ring and the lid and located at the opening end of the outer sheathing between an outer peripheral portion of the lid and an inner peripheral portion of the opening end of the outer sheathing to extend completely around the inner peripheral portion of the opening end and to hermetically seal the outer sheathing.

6. A storage battery which comprises:

a rolled, laminated battery element made up of two groups of sheet-shaped electrode materials composed of positive and negative electrode materials, laminated together through separators which separate the positive and negative electrode materials to prevent the positive and negative electrode materials from touching; each of the positive electrode materials comprising a sheet of aluminum material with a layer of positive-electrode active material on both sides and each of the negative electrode materials comprising a sheet of copper material with a layer of negative-electrode active material on both sides;

a cylindrical hollow battery case enclosing therein the laminated battery element;

a cylindrical hollow spindle made of a plastic material and arranged along a direction of an axis of the rolled, laminated battery element so that the spindle is fixedly connected to the laminated battery element and coaxially arranged with the laminated battery element with respect to the axis of the laminated battery element;

a first axial end of the spindle being constrained in a radial direction as well as the axial direction of the laminated battery element;

a second axial end of the spindle being elastically supported;

the battery case comprises a cylindrical hollow outer sheathing closed at one end and having an opening end and made of a conductive material, and a lid made of a conductive material and mounted on the outer sheathing to hermetically cover the opening end;

a negative-electrode ring being fixedly connected to the closed end of the outer sheathing and having a collared portion having a cylindrical bore to which the first axial end of the spindle is fitted so that the first axial end of the spindle is constrained in the radial direction as well as the axial direction by the collared portion of the negative-electrode ring;

a plurality of negative-electrode connecting portions being formed integral with the negative-electrode sheet and electrically connected to the negative-electrode ring;

a negative-electrode lead being welded to the negative-electrode ring;

a positive-electrode ring having a collared portion having a cylindrical bore to which the second axial end of the spindle is fitted;

a plurality of positive-electrode connecting portions being formed integral with the positive-electrode sheet and electrically connected to the positive-electrode ring;

a positive-electrode lead being welded to the positive-electrode ring; and an elastic member being interleaved between the positive-electrode ring and the lid so that the second axial end of the spindle is elastically supported on the lid via the elastic member.

7. The storage battery as claimed in claim 6, wherein:

the spindle is fixed to the laminated battery element as a central part of the laminated battery element; and the second axial end of the spindle is elastically supported on the center portion of the lid via the elastic member.

8. The storage battery as claimed in claim 7, wherein:

the positive-electrode lead comprises a first positive-electrode lead material electrically connected to the lid and a second positive-electrode lead material electrically connected to the positive-electrode ring;

the first and second positive-electrode lead materials are connected to each other at a junction; and the first positive-electrode lead material, the junction, and the second positive-electrode lead material are formed spirally to prevent an inner periphery of the positive-electrode lead and an outer periphery of the elastic member from touching.

9. The storage battery as claimed in claim 6, wherein:

the elastic member comprises an annular electrical insulator which is interleaved between the positive-electrode ring and the lid and located at the opening end of the outer sheathing between an outer peripheral portion of the lid and an inner peripheral portion of the opening end of the outer sheathing to extend completely around the inner peripheral portion of the opening end and to hermetically seal the outer sheathing.

* * * * *